US010550884B2

(12) United States Patent
Amano et al.

(10) Patent No.: US 10,550,884 B2
(45) Date of Patent: Feb. 4, 2020

(54) HALF BEARING AND SLIDING BEARING

(71) Applicant: DAIDO METAL COMPANY LTD., Nagoya (JP)

(72) Inventors: Seiji Amano, Inuyama (JP); Shinichi Sakurai, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/171,577

(22) Filed: Oct. 26, 2018

(65) Prior Publication Data

US 2019/0154084 A1 May 23, 2019

(30) Foreign Application Priority Data

Nov. 17, 2017 (JP) ................................ 2017-222051

(51) Int. Cl.

| | |
|---|---|
| ***F16C 9/02*** | (2006.01) |
| ***F16C 33/10*** | (2006.01) |
| ***F16C 9/04*** | (2006.01) |
| ***F16C 17/02*** | (2006.01) |
| ***F16C 33/04*** | (2006.01) |

(52) U.S. Cl.
CPC ............ *F16C 33/1065* (2013.01); *F16C 9/04* (2013.01); *F16C 17/022* (2013.01); *F16C 33/046* (2013.01); *F16C 33/103* (2013.01); *F16C 2240/42* (2013.01); *F16C 2360/22* (2013.01)

(58) Field of Classification Search
CPC .. F16C 9/02; F16C 9/04; F16C 17/022; F16C 33/046; F16C 33/1065; F16C 2240/42; F16C 2360/22
See application file for complete search history.

(56) References Cited

U.S. PATENT DOCUMENTS

| | | | | |
|---|---|---|---|---|
| 5,000,584 A * | 3/1991 | Simmons | B21B 31/074 | 384/114 |
| 6,095,690 A * | 8/2000 | Niegel | F16C 17/10 | 384/288 |
| 7,399,122 B2 * | 7/2008 | Fujita | F16C 9/02 | 384/276 |
| 8,646,980 B2 * | 2/2014 | Flores | F16C 9/00 | 384/288 |

FOREIGN PATENT DOCUMENTS

| | | | |
|---|---|---|---|
| EP | 1420177 A1 * | 5/2004 | F16C 9/04 |
| JP | S58-149622 U | 10/1983 | |
| JP | H08-277831 A | 10/1996 | |
| JP | 2000-504089 A | 4/2000 | |
| JP | 2008-95721 A | 4/2008 | |

* cited by examiner

*Primary Examiner* — Phillip A Johnson
(74) *Attorney, Agent, or Firm* — Snyder, Clark, Lesch & Chung, LLP

(57) ABSTRACT

Provided is a semi-cylindrical-shaped half bearing having an inner surface including a center zone and end zones each including a plurality of recesses. Each recess includes a groove forming zone adjacent to the peripheral edge and including a plurality of circumferential grooves extending from the peripheral edge along the circumferential direction. An area ratio S2 of an area of the groove forming zone to an area of the recess in the end zone is larger than an area ratio S1 in the center zone. A maximum depth D4 of the circumferential groove in the end zone is larger than a maximum depth D2 of the circumferential groove in the center zone. A sliding bearing of the present invention includes the above half bearing.

19 Claims, 8 Drawing Sheets

7

71C、71E

HALF BEARING AND SLIDING BEARING

BACKGROUND OF THE INVENTION

The present invention relates to a half bearing for constituting a sliding bearing for supporting a crankshaft of an internal combustion engine. The present invention also relates to a cylindrical sliding bearing including the half bearing and for supporting the crankshaft of the internal combustion engine.

A crankshaft of an internal combustion engine is supported in its journal part by a lower portion of a cylinder block of the engine via a main bearing constituted by a pair of half bearings. With respect to the main bearing, lubrication oil is discharged by an oil pump and fed from an oil gallery in a cylinder block wall via a through hole in a wall of the main bearing into a lubrication oil groove formed along an inner surface of the main bearing. The journal part has a first lubrication oil passage passing through the journal part in a diameter direction of the journal part, and openings at both ends of the first lubrication oil passage communicate with the lubrication oil groove of the main bearing. Furthermore, a second lubrication oil passage passing through a crank arm part branches off from the first lubrication oil passage of the journal part and communicates with a third lubrication oil passage passing through a crankpin in a diameter direction of the crankpin. Thus, the lubrication oil fed from the oil gallery in the cylinder block wall via the through hole into the lubrication oil groove on the inner surface of the main bearing passes through the first lubrication oil passage, the second lubrication oil passage, and the third lubrication oil passage. The lubrication oil is then supplied from a discharge port which opens at an end of the third lubrication oil passage to a gap between the crankpin and a sliding surface of a connecting rod bearing constituted by a pair of half bearings (see JP 08-277831A, for example). The oil is supplied to a gap between a surface of the crankshaft and a sliding surface of the main bearing and the connecting rod bearing.

In order to reduce friction loss during sliding between the crankshaft and the half bearing, it has been proposed to form a plurality of minute recesses on the sliding surface of the half bearing (see JP 58-149622U, JP 2008-95721A, and JP 2000-504089A, for example).

SUMMARY OF THE INVENTION

As described above, JP 58-149622U, JP 2008-95721A, and JP 2000-504089A disclose a conventional half bearing having a plurality of minute recesses on a sliding surface. When a surface of a crankshaft moves closer to the sliding surface of the half bearing during operation of an internal combustion engine, turbulence occurs in an oil flow near the recess. The turbulence causes friction loss and greatly reduces pressure of the oil between the sliding surface adjacent to the recess and the surface of the shaft. This causes the oil to unable to bear a load of the shaft so that the surface of the shaft comes into contact with the sliding surface, and thus the friction loss is increased.

An object of the present invention is to provide a half bearing for constituting a sliding bearing of a crankshaft of an internal combustion engine, which is capable of reducing friction loss caused by occurrence of turbulence during operation of the internal combustion engine. Another object of the present invention is to provide the sliding bearing.

In an aspect of the present invention, a half bearing is provided for constituting a sliding bearing for supporting a crankshaft of an internal combustion engine. The half bearing has a semi-cylindrical shape, and has an inner surface. The inner surface forms a sliding surface of the half bearing. The sliding surface of the half bearing includes a center zone and end zones on both sides of the center zone. The center zone includes a circumferential center of the half bearing. The sliding surface in each of the center zone and the end zones has a circular arc surface shape (i.e., has a cross section having a circular arc shape). A circle center of a circular arc surface of each of the end zones deviates from a circle center of a circular arc surface of the center zone toward a side away from the half bearing. The center zone is in a circumferential angle range of ±65° at maximum with respect to the circumferential center. The center zone preferably includes a circumferential angle range of ±40° at minimum with respect to the circumferential center.

The center zone and the end zones each include a plurality of recesses. Each recess has a recess surface and a peripheral edge. The recess surface is recessed from the sliding surface toward an outer diameter side of the half bearing. The recess surface forms a convex curve toward the outer diameter side of the half bearing in cross-sectional view in a direction parallel to a circumferential direction of the half bearing. Each recess includes a groove forming zone adjacent to the peripheral edge of the recess. The groove forming zone includes a plurality of circumferential grooves which are recessed from the recess surface toward the outer diameter side of the half bearing. The circumferential grooves extend from the peripheral edge of the recess along the circumferential direction of the half bearing.

An area ratio of an area of the groove forming zone in the recess to an area of the recess in the end zone is larger than an area ratio of an area of the groove forming zone in the recess to an area of the recess in the center zone.

Furthermore, a maximum depth of the circumferential groove in the recess in the end zone is larger than a maximum depth of the circumferential groove in the recess in the center zone.

According to an embodiment of the present invention, the area ratio S2 is preferably 1.5 times or more as large as the area ratio S1. The area ratio S1 is defined as a ratio of the area of the groove forming zone in the recess to the area of the recess in the center zone. The area ratio S2 is defined as a ratio of the area of the groove forming zone in the recess to the area of the recess in the end zone.

According to an embodiment of the present invention, the maximum depth D4 is preferably twice or more as large as the maximum depth D2. The maximum depth D2 is defined as a maximum depth of the circumferential groove in the recess in the center zone. The maximum depth D4 is defined as a maximum depth of the circumferential groove in the recess in the end zone.

According to an embodiment of the present invention, a depth D1 of the recess (i.e., a depth from the sliding surface to a deepest part of the recess surface) in the center zone is preferably 2 to 50 μm.

According to an embodiment of the present invention, a depth D2 of the circumferential groove in the recess (i.e., a depth from the recess surface to a deepest part of the circumferential groove) in the center zone preferably increases from a center of the recess toward a peripheral edge side of the recess.

According to an embodiment of the present invention, the maximum depth D2 of the circumferential groove in the recess in the center zone is preferably 0.5 to 3 μm.

According to an embodiment of the present invention, the maximum depth D4 of the circumferential groove in the recess in the end zone is preferably 1 to 10 μm.

According to an embodiment of the present invention, a maximum width W of the circumferential groove in each of the center zone and the end zones is preferably 20 to 150 μm.

According to an embodiment of the present invention, the area ratio S1 of the area of the groove forming zone in the recess to the area of the recess in the center zone is preferably 0.15 to 0.55.

According to an embodiment of the present invention, the area ratio S2 of the area of the groove forming zone in the recess to the area of the recess in the end zone is preferably 0.3 to 0.90.

According to an embodiment of the present invention, an opening of the recess on the sliding surface preferably has a circular shape, an elliptical shape, or a quadrilateral shape.

According to an embodiment of the present invention, the recess surface of each of the center zone and the end zones preferably forms a convex curve recessed toward the outer diameter side of the half bearing in cross-sectional view in an axial direction of the half bearing.

According to an embodiment of the present invention, the recesses are preferably uniformly located throughout the sliding surface of the half bearing.

According to an embodiment of the present invention, as the recess in the center zone is located closer to the circumferential center of the half bearing, the depth D1 of the recess preferably increases. In other words, as the recess in the center zone is located closer to a circumferential end of the half bearing, the depth D1 of the recess preferably decreases.

According to an embodiment of the present invention, as the recess in the center zone is located closer to the circumferential center of the half bearing, an area A1 of the opening of the recess preferably increases. In other words, as the recess in the center zone is located closer to a circumferential end of the half bearing, the area A1 of the opening of the recess preferably decreases.

According to an embodiment of the present invention, as the recess on the sliding surface in the center zone is located closer to the circumferential center of the half bearing, the area ratio S1 of the area of the groove forming zone to the area of the recess preferably decreases. In other words, as the recess on the sliding surface in the center zone is located closer to a circumferential end of the half bearing, the area ratio S1 preferably increases.

In another aspect, the present invention also provides a cylindrical sliding bearing for supporting a crankshaft of an internal combustion engine and including the above half bearing. The sliding bearing is preferably constituted by combining a pair of the half bearings together.

DETAIL DESCRIPTION OF THE INVENTION

Embodiments of the present invention will be described below with reference to the drawings.

Figure 1:
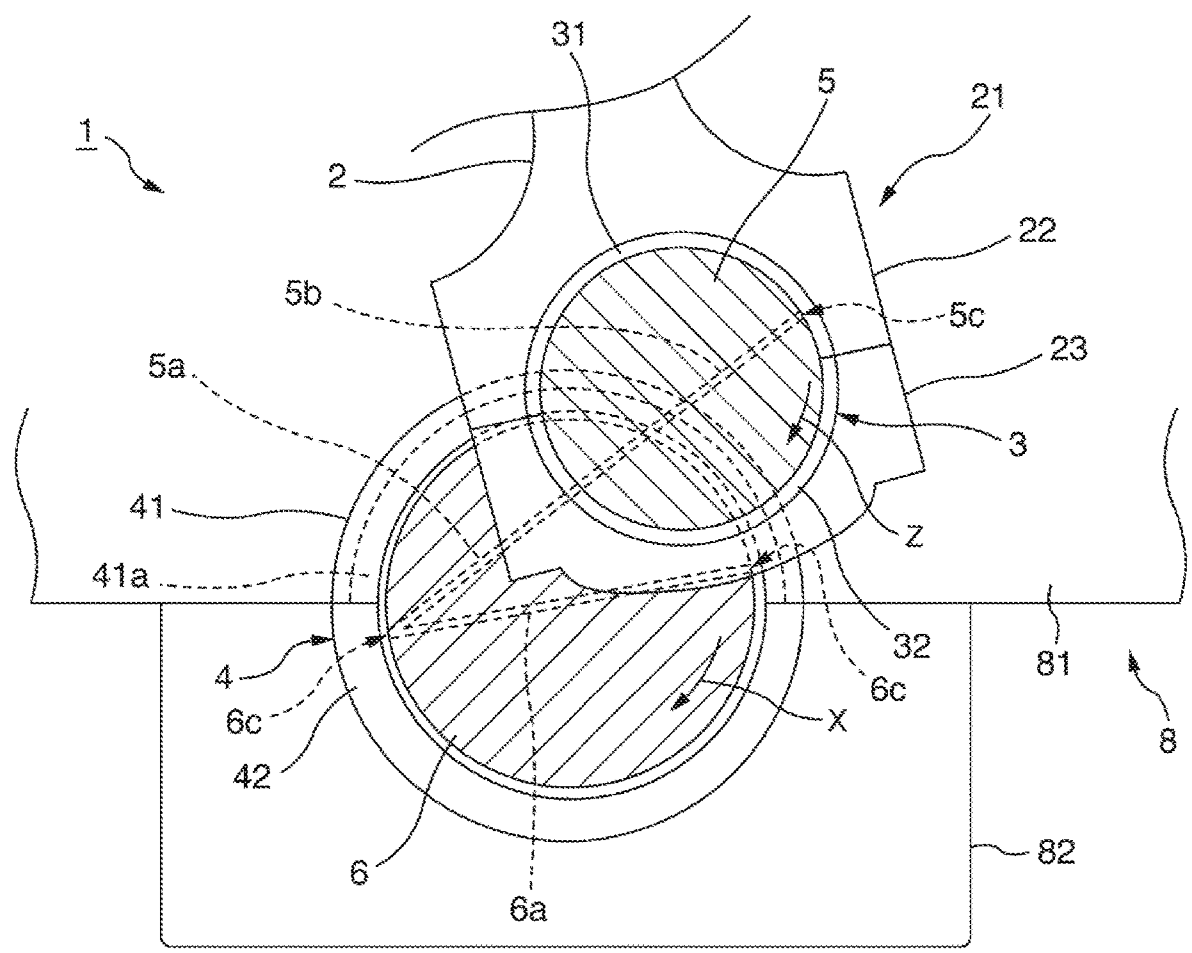
FIG. 1 is a schematic diagram showing a bearing device of a crankshaft.

FIG. 1 schematically shows a bearing device 1 of an internal combustion engine. The bearing device 1 includes a journal part 6, a crankpin 5, and a connecting rod 2. The journal part 6 is supported by a lower portion of a cylinder block 8. The crankpin 5 is integrally formed with the journal part 6 and rotates about the journal part 6. The connecting rod 2 transmits reciprocating motion from the internal combustion engine to the crankpin 5. The bearing device 1 further includes sliding bearings for supporting a crankshaft, one of which is a main bearing 4 rotatably supporting the journal part 6 and another is a connecting rod bearing 3 rotatably supporting the crankpin 5.

Please note that a description will be made with reference to a single journal part 6 and a single crankpin 5 for convenience of description, while the crankshaft includes a plurality of journal parts 6 and a plurality of crankpins 5. With regard to a positional relationship between the journal part 6 and the crankpin 5 in a vertical direction of a page in FIG. 1, the journal part 6 is located behind the crankpin 5 in FIG. 1.

The journal part 6 is pivotally supported by a cylinder block lower portion 81 of the internal combustion engine via the main bearing 4 composed of a pair of half bearings 41 and 42. The half bearing 41 on an upper side in FIG. 1 has an oil groove 41*a* which extends along the entire length of an inner surface of the half bearing 41. The journal part 6 has a lubrication oil passage 6*a* which passes through the journal part 6 in a diameter direction of the journal part 6. When the journal part 6 rotates in a direction of an arrow X, entrance openings 6*c* at both ends of the lubrication oil passage 6*a* alternately communicate with the oil groove 41*a* of the main bearing 4.

The crankpin 5 is pivotally supported by a large end housing 21 (a rod-side large end housing 22 and a cap-side large end housing 23) of the connecting rod 2 via the connecting rod bearing 3 composed of a pair of half bearings 31 and 32.

In the main bearing 4, lubrication oil discharged by an oil pump is fed from an oil gallery in a cylinder block wall, via a through hole in a wall of the main bearing 4, into the oil groove 41*a* formed along an inner surface of the main bearing 4, as described above.

Furthermore, the first lubrication oil passage 6*a* passes through the journal part 6 in the diameter direction of the journal part 6, and the entrance openings 6*c* of the first lubrication oil passage 6*a* communicate with the lubrication oil groove 41*a*. A second lubrication oil passage 5*a* passing through a crank arm part (not shown) branches off from the first lubrication oil passage 6*a* of the journal part 6 and communicates with a third lubrication oil passage 5*b* passing through the crankpin 5 in a diameter direction of the crankpin 5.

Thus, the lubrication oil passes through the first lubrication oil passage 6*a*, the second lubrication oil passage 5*a*, and the third lubrication oil passage 5*b* and is supplied from a discharge port 5*c* at an end of the third lubrication oil passage 5*b* to a gap formed between the crankpin 5 and the connecting rod bearing 3.

In general, the main bearing 4 and the connecting rod bearing 3 bear a dynamic load from the crankshaft by pressure generated in oil between a sliding surface of the main bearing 4 and the connecting rod bearing 3 and a surface of the shaft. Throughout operation of the internal combustion engine, the load and its direction constantly change, which is applied to the sliding surface of the main bearing 4 and the connecting rod bearing 3. Central axes of the journal part 6 and the crankpin 5 move eccentrically with respect to a bearing central axis of, respectively, the main bearing 4 and the connecting rod bearing 3 so that oil film pressure is generated proportionally to the load. Accordingly, a bearing gap of the main bearing 4 and the connecting rod bearing 3 (gap between the surface of the shaft and the sliding surface) constantly changes at any position on the sliding surface. For example, in the case of a four-stroke internal combustion engine, the maximum load is applied to the connecting rod bearing and the main bearing in a combustion stroke. In this case, for example for the connecting rod bearing, the crankpin 5 moves in a direction (indicated by "arrow M") toward the sliding surface near a circumferential center of the half bearing on the upper side in FIG. 1. Then, the sliding surface near the circumferential center of the half bearing becomes closest to a surface of the crankpin, and a load is applied in the direction toward the sliding surface near the circumferential center of the half bearing.

For the main bearing, a load is applied in a direction toward the sliding surface near a circumferential center of the half bearing provided on a bearing cap 82 side on a lower side in FIG. 1, and the sliding surface near the circumferential center of the half bearing on the lower side becomes closest to a surface of the journal part 6.

A conventional half bearing having a sliding surface including a plurality of minute recesses has the following problems. When a surface of a shaft separated from the sliding surface of the half bearing having the minute recesses moves relatively closer to the sliding surface and the surface of the shaft becomes closest to the sliding surface, oil in the recess is compressed to have high pressure and flows out from the recess to a gap between the sliding surface and the surface of the shaft. In a case where the minute recess has a smooth surface, among oil flows that are compressed to have high pressure in the recess and overflow from the recess into the gap, only some of the oil flows flow in the same direction as a rotation direction of the shaft, and most of the oil flows flow in a direction different from the shaft rotation direction. Since an oil flow following the rotating surface of the shaft has been formed in the gap between the sliding surface and the surface of the shaft, when the oil flow in a direction different from the shaft rotation direction flows out from the recess, the oil flows flowing in different directions collide with each other between the sliding surface adjacent to an opening of the recess and the surface of the shaft, thereby causing turbulence. The occurrence of turbulence causes friction loss. When the turbulence greatly reduces pressure of the oil between the sliding surface adjacent to the opening of the recess and the surface of the shaft, a load of the shaft becomes unbearable so that the surface of the shaft comes into contact with the sliding surface, and thus the friction loss is increased.

The present invention addresses such problems of the conventional techniques. In a half bearing according to the present invention, as described below, a sliding surface of the half bearing includes a center zone and two end zones on both sides of the center zone. The center zone and the end zones each include a circular arc surface, and a circle center of the circular arc surface of the center zone does not coincide with that of the circular arc surface of each of the end zones. The center zone and the end zones each have a plurality of recesses. A recess in any of the zones has a smooth recess surface which is recessed from the sliding surface toward an outer diameter side of the half bearing. The recess has a groove forming zone adjacent to a peripheral edge of the recess, and the groove forming zone has a plurality of circumferential grooves which are recessed from the recess surface toward the outer diameter side of the half bearing. The recess surface forms a convex curve recessed toward the outer diameter side of the half bearing in cross-sectional view in a direction parallel to a circumferential direction of the half bearing. The circumferential grooves extend parallel to the circumferential direction of the half bearing.

Herein, the term "recess surface" indicates a surface of the recess excluding the circumferential grooves. A "plane zone" is defined as a largest zone as far as it does not intersect the circumferential grooves, and has a center at the same position as that of the recess and has a shape similar to that of an opening of the recess. The "opening of the recess" indicates a face on which the recess intersects the sliding surface (or a virtual extension surface of the sliding surface). In other words, the "opening of the recess" has a shape of the recess viewed from a direction perpendicular to the sliding surface. The "groove forming zone" indicates a zone on the surface of the recess other than the plane zone. The "groove forming zone" includes both the smooth recess surface and the circumferential grooves. In the present invention, an area ratio of an area of the groove forming zone in the recess to an area of the recess on the sliding surface in the end zone is larger than an area ratio of an area of the groove forming zone in the recess to an area of the recess on the sliding surface in the center zone. Furthermore, the maximum depth of the circumferential groove in the recess on the sliding surface in the end zone is larger than the maximum depth of the circumferential groove in the recess on the sliding surface in the center zone.

In the following, an exemplary half bearing of the present invention applied to the connecting rod bearing 3 will be described. Please note that the present invention is not limited to the connecting rod bearing 3 and may be configured as the half bearing for constituting the main bearing 4. It is possible to employ the half bearing of the present invention as both of a pair of half bearings for constituting the connecting rod bearing 3 or the main bearing 4. Alternatively, only one of the pair of half bearings for constituting the connecting rod bearing 3 or the main bearing 4 may be the half bearing of the present invention, and the other of the half bearings may be a conventional half bearing, for example having no recesses on a sliding surface.

Figure 2:
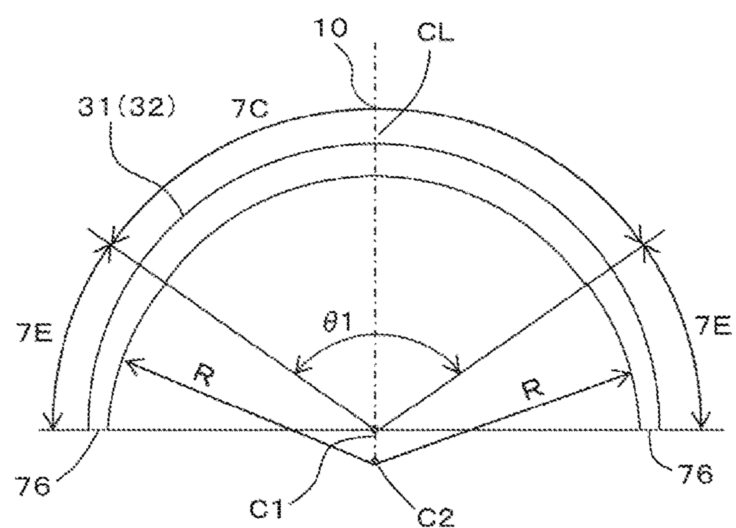
FIG. 2 shows a half bearing according to a first embodiment of the present invention, viewed from an axial direction of the half bearing.

FIG. 2 shows a first embodiment of the half bearing (for the connecting rod bearing 3) according to the present invention. The connecting rod bearing 3 is formed by combining a pair of half bearings 31 and 32 into a generally cylindrical shape as a whole so that circumferential end faces 76 of the half bearing 31 abut with circumferential end faces 76 of the half bearing 32. An inner surface of the cylindrical shape forms a sliding surface 7. The sliding surface 7 includes a center zone 7C and end zones 7E on both sides of the center zone. The center zone 7C includes a circumferential center 10 of the bearing half 31, 32. The center zone 7C and the end zones 7E each have a circular arc surface shape (i.e., a circular arc shape in cross-sectional view in a circumferential direction of the bearing half 31, 32), and a circle center C1 of a circular arc of the center zone 7C deviates from a circle center C2 of a circular arc of each of the end zones 7E. The circle centers of the center zone 7C and the end zones 7E are located on an imaginary center line CL passing through the circumferential center 10 of the bearing half 31, 32. The circle center C2 of the end zones 7E is located on an outer side of the circle center C1 of the center zone 7C, that is, located at a position deviated from the circle center C1 toward a side away from the bearing half 31, 32. The circle centers C1 and C2 are preferably located on the center line CL. Furthermore, the circle center C1 is preferably a center of the cylindrical shape of the half bearing. The two end zones preferably have the same circle center, but may have different circle centers as long as the above relationship is satisfied.

The center zone 7C and the end zones 7E each have the circular arc shape in cross-sectional view in the circumferential direction of the bearing half 31, 32. However, the center zone 7C and the end zones 7E do not necessarily have a geometrically precise circular arc shape, and for example, may have an elliptic arc shape.

A circumferential angle θ1 of the center zone 7C is in a range of ±65° with respect to the circumferential center 10 (assuming that the circumferential angle is 0° at the circumferential center 10). That is, one of circumferential ends of the center zone 7C is in a range of 0° to −65°, and the other circumferential end is in a range of 0° to 65° (a positive circumferential angle direction may be a circumferential direction toward either of the circumferential ends of the center zone 7C). However, the center zone 7C is preferably symmetric with respect to the center line CL. Furthermore, the circumferential angle θ1 of the center zone 7C preferably includes a range of −40° to 40°. The circumferential angle indicates a circumferential angle around the circle center C1 of the center zone 7C.

Preferably, the bearing half 31, 32 has a constant thickness in the center zone 7C in the circumferential direction. However, the bearing half 31, 32 may have a changing thickness, and for example, the thickness may be maximum at the circumferential center of the bearing half 31, 32 and continuously decrease toward the circumferential ends in the center zone 7C.

Figure 3:
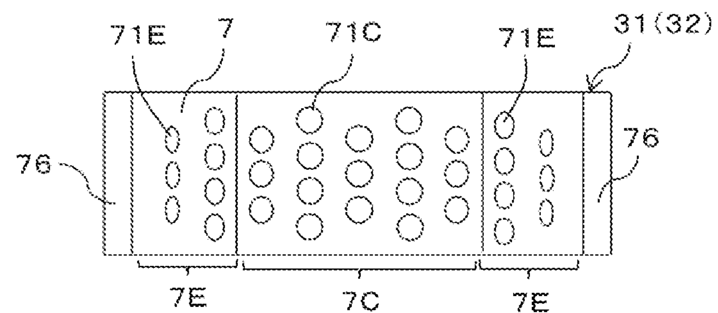
FIG. 3 is a plan view of the half bearing in FIG. 2, viewed from a sliding surface side.
Figure 4:
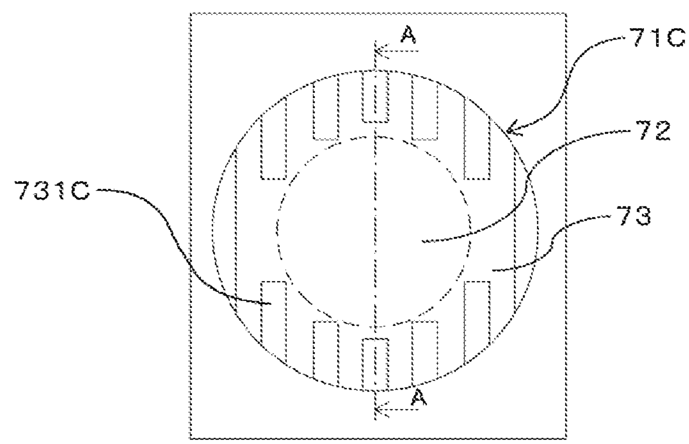
FIG. 4 shows a recess in a center zone in FIG. 3, viewed from the sliding surface side.
Figure 6:
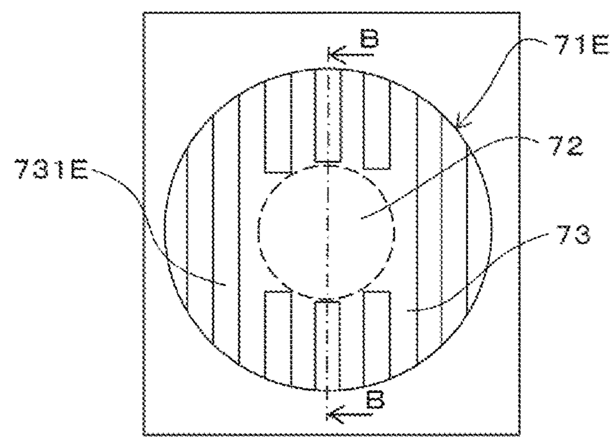
FIG. 6 shows a recess in an end zone in FIG. 3, viewed from the sliding surface side.

FIG. 3 shows an example of a plurality of recesses 71C and 71E on the sliding surface of the half bearing. FIG. 4 shows an example of the recess 71C in the center zone 7C, viewed from a sliding surface side. FIG. 6 shows an example of the recess 71E in the end zone 7E, viewed from the sliding surface side. Please note that the present invention is not limited to the embodiment. For easier understanding, the recesses are exaggerated in the drawings.

In this embodiment, the plurality of recesses 71C and 71E on the sliding surface 7 of the bearing half 31, 32 having openings having the same shape, area, and size, such as a depth, are uniformly arranged substantially throughout the sliding surface including the center zone and the end zones. The "uniform arrangement" of the plurality of recesses 71C and 71E on the sliding surface 7 does not indicate strictly geometrically uniform arrangement but may be approximately or substantially uniform arrangement. Since FIG. 3 is a plan view of the bearing half 31, 32 having a semi-cylindrical shape, viewed from the sliding surface side, as the recess is located closer to the circumferential end 76, the recess appears more distorted in FIG. 3.

FIG. 4 shows the recess 71C having a circular opening to the sliding surface 7 in the center zone 7C. The recess 71C includes a plane zone 72 and a groove forming zone 73. The plane zone 72 is a smooth (flat) central surface of the recess 71C, and the groove forming zone 73 is located adjacent to a peripheral edge of the recess 71C and includes a plurality of circumferential grooves 731C. In the groove forming zone 73, the circumferential grooves 731C extend from the peripheral edge of the recess 71C along the circumferential direction of the bearing half on a smooth (flat) surface extending from the plane zone 72. In FIG. 4, a zone surrounded by a dashed line (virtual line) is the plane zone 72, and the groove forming zone 73 is between the dashed line and the peripheral edge of the recess.

Figure 5:
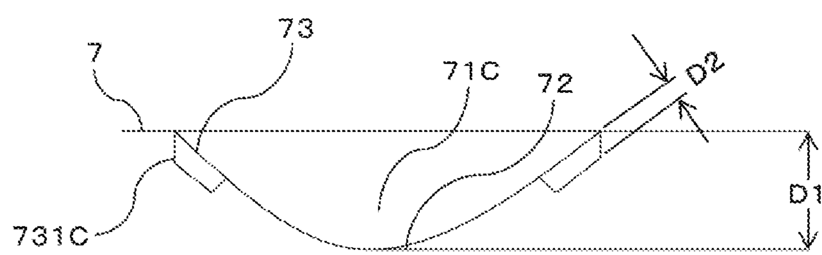
FIG. 5 is a cross-sectional view of an A-A cross section (in circumferential direction) in FIG. 4.

The recess surface of the recess 71C (surface of the recess 71C excluding the circumferential grooves) is recessed toward an outer diameter side of the bearing half 31, 32 in cross-sectional view (A-A cross section in FIG. 4) in a direction parallel to the circumferential direction of the bearing half 31, 32. That is, the recess surface forms a convex curve toward the outer diameter side (see FIG. 5).

In an embodiment, the recess 71C may also form a curve which is recessed toward the outer diameter side of the bearing half 31, 32 in cross-sectional view in any direction (e.g., cross section in a direction perpendicular to the sliding surface 7) as well as the direction parallel to the circumferential direction of the bearing half 31, 32.

The recess 71C has a depth D1 from the sliding surface 7 (which is a depth at the deepest part of the recess from the sliding surface adjacent to the recess) of preferably 2 to 50 μm, more preferably 2 to 30 μm. In a case where the opening of the recess 71C to the sliding surface 7 has a circular shape, the opening may have a diameter of 0.05 to 5 mm. In a case where the opening of the recess has a shape other than the circular shape, the opening may have the same area as that of a circle having the above diameter (equivalent circle diameter).

While the plurality of circumferential grooves 731C extend from the peripheral edge of the recess 71C in the direction parallel to the circumferential direction of the bearing half 31, 32, the term "parallel" allows that the grooves are slightly tilted (up to 1°) with respect to the circumferential direction of the bearing half 31, 32.

In an embodiment, the circumferential groove 731C has a depth D2, which is a depth from a smooth surface of the groove forming zone, and the depth D2 is made constant along a longitudinal direction or a direction in which the circumferential groove 731C extends, except in a circumferential end region. Furthermore, a width W of the circumferential groove 731C (which is a length of the groove in an axial direction of the half bearing) is also made constant along the longitudinal direction of the circumferential groove 731C. A cross section of the circumferential groove 731C may be shaped rectangular.

The depth D2 of the circumferential groove 731C (a depth at the deepest part of the circumferential groove from the recess surface adjacent to the circumferential groove) is preferably 0.5 to 3 μm. The depth D2 of the circumferential groove 731C is smaller than the depth D1 of the recess 71C. The width W of the circumferential groove 731C is preferably 20 to 150 μm. The width W of the circumferential groove 731C is preferably determined such that at least three circumferential grooves 731C are formed in a single recess 71C. The depth D2 and the width W of the circumferential groove 731C may be changed along the longitudinal direction of the circumferential groove 731C. In such a case, the maximum depth and the maximum width of the circumferential groove 731C are preferably sized to meet the above described depth and width sizes. The maximum depth and the maximum width of the circumferential groove 731C are preferably the same in the recesses 71C in the center zone 7C.

Preferably, the recess 71C in the center zone 7C has an area ratio S1 of the groove forming zone 73 to the recess being 0.15 to 0.55. An area A1 of the recess is defined as an area viewed from the sliding surface side (i.e., the recess viewed from the direction perpendicular to the sliding surface). An area A2 of the groove forming zone is defined as an area viewed from the sliding surface side (i.e., the recess viewed from the direction perpendicular to the sliding surface). An area of the plane zone is similarly defined.

The area ratio 51 is defined as a ratio (A2/A1) of the area A2 of the groove forming zone 73 to the area A1 of the recess (which is a sum of the area of the plane zone 72 and the area of the groove forming zone 73) (see FIG. 4).

FIG. 6 shows the recess 71E having a circular opening to the sliding surface 7 in the end zone 7E. The recess 71E includes a plane zone 72 and a groove forming zone 73. The plane zone 72 is a smooth (flat) central surface of the recess 71E, and the groove forming zone 73 is located adjacent to a peripheral edge of the recess 71E and includes a plurality of circumferential grooves 731E. In the groove forming zone 73, the circumferential grooves 731E extend from the peripheral edge of the recess 71E along the circumferential direction of the bearing half on a smooth (flat) surface extending from the plane zone 72.

In the recess 71E in the end zone 7E, an area ratio S2 of an area of the groove forming zone 73 to an area of the recess is larger than the area ratio S1 of the area of the groove forming zone 73 to the area of the recess in the recess 71C in the center zone 7C. Preferably, the recess 71E in the end zone 7E has the area ratio S2 of the area of the groove forming zone 73 to the area of the recess being 0.3 to 0.9. Furthermore, in the recess 71E in the end zone 7E, the area ratio S2 of the area of the groove forming zone 73 to the area of the recess is preferably twice or more as large as the area ratio S1 of the area of the groove forming zone 73 to the area of the recess in the recess 71C in the center zone 7C.

Figure 7:
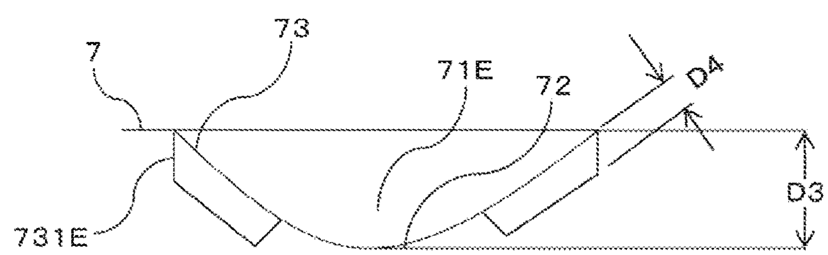
FIG. 7 is a cross-sectional view of a B-B cross section (in circumferential direction) in FIG. 6.

The recess surface of the recess 71E (a surface of the recess 71E excluding the circumferential grooves) is recessed toward the outer diameter side of the bearing half 31, 32 in cross-sectional view (see B-B cross section in FIG. 6) in the direction parallel to the circumferential direction of the bearing half 31, 32. That is, the recess surface forms a convex curve toward the outer diameter side (see FIG. 7). In an embodiment, the recess 71E may also form a curve which is recessed toward the outer diameter side of the bearing half 31, 32 in cross-sectional view in any direction (e.g., cross section in the direction perpendicular to the sliding surface 7) as well as the direction parallel to the circumferential direction of the bearing half 31, 32.

The recess 71E has a depth D3 from the sliding surface 7 (which is a depth at the deepest part of the recess from the sliding surface adjacent to the recess) of preferably 2 to 50 μm, more preferably 2 to 30 μm. In a case where the opening of the recess 71E to the sliding surface 7 has a circular shape, the opening may have a diameter of 0.05 to 5 mm. In a case where the opening of the recess has a shape other than the circular shape, the opening may have the same area as that of a circle having the above diameter (equivalent circle diameter).

While the plurality of circumferential grooves 731E extend from the peripheral edge of the recess 71E in the direction parallel to the circumferential direction of the bearing half 31, 32, the term "parallel" allows that the grooves are slightly tilted (up to 1°) with respect to the circumferential direction of the bearing half 31, 32. In an embodiment, the circumferential groove 731E has a depth D4, which is a depth from a smooth surface of the groove forming zone, and the depth D4 is made constant along a longitudinal direction or a direction in which the circumferential groove 731E extends. Furthermore, a width W of the circumferential groove 731E (which is a length of the groove in the axial direction of the half bearing) is also made constant along the longitudinal direction of the circumferential groove 731E. A cross section of the circumferential groove 731E may be shaped rectangular.

The depth D4 of the circumferential groove 731E in the recess 71E in the end zone 7E is larger than the depth D2 of the circumferential groove 731C in the recess 71C in the center zone 7C. Preferably, the depth D4 of the circumferential groove 731E in the recess 71E in the end zone 7E is 1 to 10 μm. Furthermore, the depth D4 of the circumferential groove 731E in the recess 71E in the end zone 7E is preferably twice or more as large as the depth D2 of the circumferential groove 731C in the recess 71C in the center zone 7C.

In this embodiment, the depth D4 of the circumferential groove 731E is smaller than the depth D3 of the recess 71E. The width W of the circumferential groove 731E is preferably 20 to 150 μm. The width W of the circumferential groove 731E is preferably determined such that at least three circumferential grooves 731E are formed in a single recess 71E. The depth D4 and the width W of the circumferential groove 731E may be changed along the longitudinal direction of the circumferential groove 731E. In such a case, the maximum depth and the maximum width of the circumferential groove 731E are preferably sized to meet the above described depth and width sizes. The maximum depth and the maximum width of the circumferential groove 731E are preferably the same in the recesses 71E in the end zone 7E.

The connecting rod bearing 3 of this embodiment is formed by combining a pair of half bearings 31 and 32 into a generally cylindrical shape as a whole so that the circumferential end faces 76 of the half bearing 31 are butted against the circumferential end faces 76 of the half bearing 32. The bearing half 31, 32 may have a sliding layer made of a Cu bearing alloy or an Al bearing alloy. Alternatively, the bearing half 31, 32 may have a sliding layer made of a Cu bearing alloy or an Al bearing alloy on a back-metal layer made of an Fe alloy. The sliding surface 7 (or a surface of the sliding layer including inner surfaces of the recess 71C and the recess 71E) is the inner surface of the cylindrical shape and may have a surface part made of one of Bi, Sn, and Pb, which are softer than the bearing alloy, or an alloy including the metals as a main component. Alternatively, the surface part may be made of a resin composition including synthetic resin as a main component. However, the surfaces of the recess 71C and the recess 71E preferably do not have such a surface part. If the surfaces of the recess 71C and the recess 71E or the surfaces of the circumferential grooves 731C and the circumferential groove 731E have such a soft surface part, when oil contains many foreign substances, the foreign substances are more likely to be embedded and accumulated. If the foreign substances are embedded and accumulated on the surfaces of the recess 71C and the recess 71E or the surfaces of the circumferential grooves 731C and the circumferential groove 731E, turbulence is more likely to occur in the oil flowing in the recess. Please note that, even though the above surface part is added onto the sliding layer, the surface of the sliding layer is referred to as a sliding surface.

As described above, the half bearing of the present invention has the recesses 71C and the recesses 71E in the center zone 7C and the end zones 7E, respectively, and each recess includes the plane zone 72 and the groove forming zone 73. The half bearing can reduce friction loss. A reason thereof will be described below.

Figure 8:
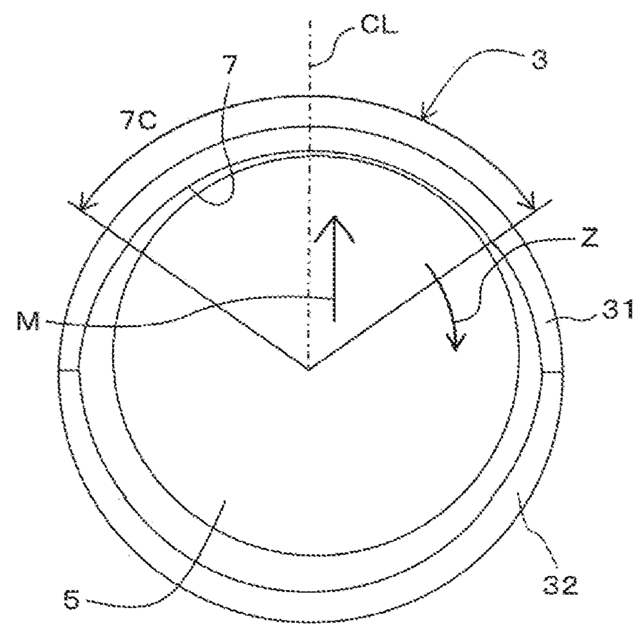
FIG. 8 shows relative movement of a shaft to half bearings.

FIG. 8 shows a state where a surface of the shaft 5 distant from the sliding surface 7 of the half bearing 31 has moved relatively closer to the sliding surface 7 and the surface of the shaft 5 has become closest to the sliding surface 7. As described above, in the combustion stroke of the internal combustion engine, the shaft 5 moves in a direction (indicated by "arrow M") toward the sliding surface 7 near the circumferential center of the half bearing 31, and the sliding surface 7 in the center zone 7C of the half bearing 31 becomes closest to the surface of the shaft 5.

In this state, the oil in the recess 71C in the center zone 7C is most compressed to have high pressure particularly near a center of the recess surface of the opening. However, since the surface in the plane zone 72 of the opening is smooth, an oil flow F1 flows in all directions (see FIG. 9). The oil flow F1 is also formed in a direction different from a rotation direction Z of the shaft. However, in the recess 71C, the groove forming zone 73 adjacent to the peripheral edge of the opening has the plurality of circumferential grooves 731C which extend in the direction parallel to the circumferential direction of the half bearing 31. Thus, the oil flow F1 flowing from the plane zone 72 is guided to the circumferential grooves 731C and flows (oil flow F2 in FIG. 9) in the same direction as the circumferential direction of the half bearing 31 (rotation direction Z of the shaft). The oil flow then flows out in the same direction as the circumferential direction of the half bearing 31 into a gap between the sliding surface 7 of the half bearing 31 and the surface of the shaft.

Figure 9:
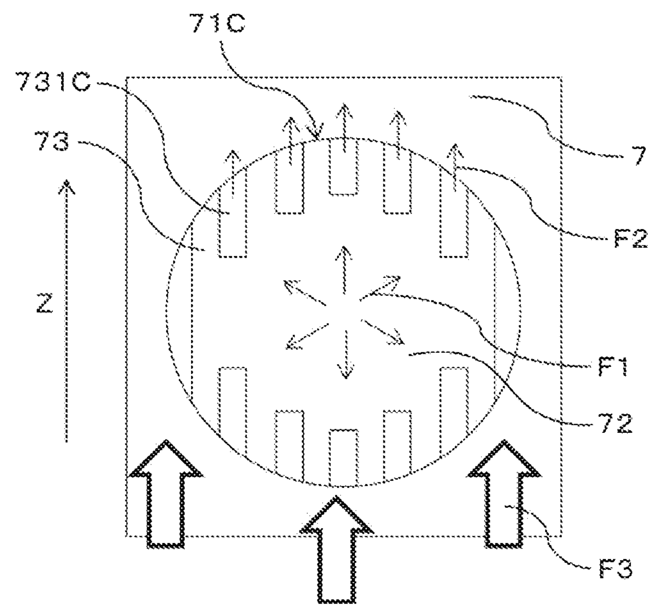
FIG. 9 shows oil flows in the recess in FIG. 4.

In the gap between the sliding surface 7 and the surface of the shaft 5, an oil flow F3 following the rotating surface of the shaft has been formed (see FIG. 9). The oil flow F3 flows in the same direction as the oil flow F2 flowing from the recess 71C. Accordingly, turbulence is less likely to occur, and thus friction loss is less likely to occur.

Even when the sliding surface 7 in the center zone 7C of the half bearing 31 becomes closest to the surface of the shaft 5, a sufficient gap is formed between the sliding surface 7 in the end zone 7E and the surface of the shaft 5. Thus, pressure of oil in the recess 71E on the sliding surface 7 in the end zone 7E is less likely to become high, and an oil flow flowing in a direction opposite to the shaft rotation direction Z is less likely to be formed from the oil in the recess 71E.

It is preferable to enhance an effect that the circumferential grooves 731E allow the oil in the recess 71E to form an oil flow F2 flowing in the same direction as the shaft rotation direction Z as below. That is, in the recess 71E on the sliding surface 7 in the end zone 7E, the area ratio S2 of the groove forming zone 73 to the recess is preferably larger than the area ratio S1 of the groove forming zone 73 to the recess in the recess 71C in the center zone 7C. Furthermore, the depth D4 of the circumferential grooves 731E in the recess 71E in the end zone 7E is preferably larger than the depth D2 of the circumferential groove 731C in the recess 71C in the center zone 7C.

Figure 10:
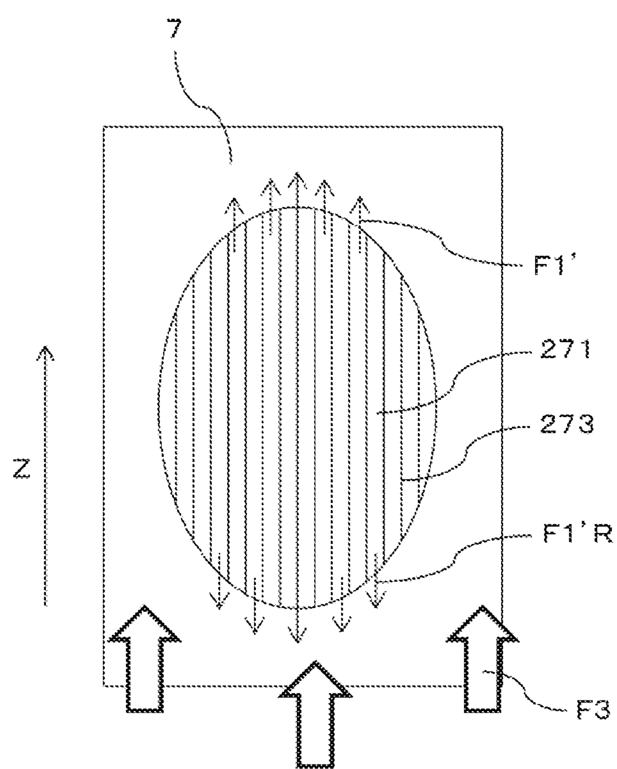
FIG. 10 shows a recess of Comparative Example, viewed from the sliding surface side.
Figure 11:
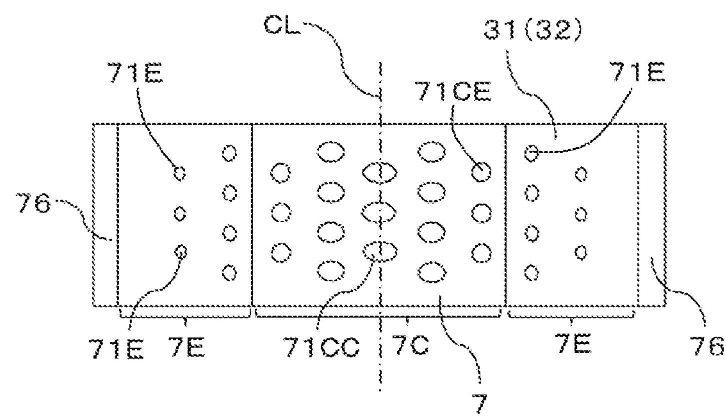
FIG. 11 is a plan view showing the half bearing according to a second embodiment of the present invention, viewed from the sliding surface side.

FIG. 10 shows a recess 271 on a sliding surface 7 in a center zone 7C, which is different from the present invention, viewed from the sliding surface side. The recess 271 has an elliptical opening on the sliding surface 7. Throughout a surface of the recess 271 including the surface near a center of the recess 271, the recess 271 has circumferential grooves 273 which are parallel to the circumferential direction of the half bearing, and the recess 271 has no plane zone. Other configurations are the same as those described above.

FIG. 10 shows oil flows F1' and F1'R flowing from the recess 271 on the sliding surface 7 in the center zone 7C into a gap between the sliding surface 7 and the surface of the shaft when the sliding surface 7 becomes closest to the surface of the shaft. As described above, an arrow Z indicates the rotation direction of the shaft (moving direction of the surface of the shaft).

When the sliding surface 7 becomes closest to the surface of the shaft, oil in the recess 271 on the sliding surface 7 in the center zone 7C is compressed to have high pressure, and in particular, high pressure is generated in the oil near the surface around the center of the recess 271, at which the recess is deepest. In FIG. 10, since this zone also has the circumferential grooves 273, the oil at particularly high pressure is guided to the circumferential grooves 273. This causes the oil in the recess 271 to form not only the oil flow F1' flowing in the same direction as the shaft rotation direction Z toward the gap between the sliding surface 7 and the surface of the shaft, but also the oil flow F1'R flowing in a direction opposite to the shaft rotation direction Z.

In the gap between the sliding surface 7 and the surface of the shaft 5, an oil flow F3 following the rotating surface of the shaft has been formed. When the oil flow F1'R and the oil flow F3, which flow in opposite directions collide with each other between the sliding surface 7 adjacent to the opening of the recess 271 and the surface of the shaft, turbulence occurs. The occurrence of turbulence causes friction loss. When the turbulence greatly reduces pressure of the oil between the sliding surface 7 adjacent to the opening of the recess 271 and the surface of the shaft, a load of the shaft becomes unbearable so that the surface of the shaft comes into contact with the sliding surface, and thus the friction loss is increased.

This embodiment relates to an example in which the plurality of recesses 71 are uniformly located substantially throughout the sliding surface 7 in the center zone 7C and the sliding surface 7 in the end zone 7E of the bearing half 31, 32. However, the present invention is not limited to the embodiment, and a plurality of recesses may be partially provided only in a region on the sliding surface 7 in the center zone 7C or a region on the sliding surface 7 in the end zone 7E, or may be partially provided only in a region on the sliding surface 7 in the center zone 7C and a region on the sliding surface 7 in the end zone 7E. Furthermore, the recess 71 including a boundary portion between the center zone 7C and the end zone 7E preferably has the configuration of the recess 71E in the end zone 7E, but may have the configuration of the recess 71C in the center zone 7C.

Alternative non-limiting embodiments of the present invention will be described below.

Second Embodiment

Referring to FIGS. 11 to 15, a plurality of recesses 71C and a plurality of recesses 71E are substantially uniformly located on the sliding surface in the center zone 7C and the end zones 7E, respectively. Each recess has an elliptical opening with its major axis extending along a direction parallel to the circumferential direction of the bearing halve 31, 32 (also in FIG. 11, as the recess is located closer to the circumferential end 76, the recess appears more distorted). As the recess 71C, 71E is located closer to the circumferential center 10 of the bearing half 31, 32 in the circumferential direction, an area A1 of the opening of the recess increases. In other words, as the recess 71C, 71E is located closer to the circumferential end 76, the area A1 decreases. Alternatively, the major axis of the elliptical opening of the recess may extend along a direction other than the direction parallel to the circumferential direction of the bearing half 31, 32. For example, it may extend along an axial direction of the bearing half 31, 32.

The recess 71C on the sliding surface 7 in the center zone 7C has a curved surface which is recessed toward the outer diameter side (i.e. convex toward the outer diameter side) of the bearing half 31, 32 not only in cross-sectional view in the direction parallel to the circumferential direction of the bearing half 31, 32 but also in cross-sectional view in any direction other than the direction parallel to the circumferential direction. Circumferential grooves 731C in the recess 71C have an arcuate cross section (see FIG. 14). Except the grooves at end regions of the recess 71C in the axial direction of the half bearing, a width W of the circumferential groove 731C is maximum on a peripheral edge side of the recess and decreases toward a center of the recess. Similarly, a depth D2 of the circumferential groove 731C is maximum on the peripheral edge side of the recess and decreases toward the center of the recess. The maximum depth and the maximum width of the circumferential groove 731C are the same in the recesses 71C on the sliding surface 7 in the center zone 7C.

As the recess 71C on the sliding surface 7 in the center zone 7C is located closer to the circumferential center 10 of the bearing half 31, 32, a depth D1 (maximum depth) of the recess 71C increases. In other words, as the recess 71C is located closer to the circumferential end 76, the depth D1 decreases. Furthermore, as the recess 71C is located closer to the circumferential center 10 of the bearing half 31, 32, the area A1 of the recess 71C increases. In other words, as the recess 71C is located closer to the circumferential end 76, the area A1 decreases.

Figure 12:
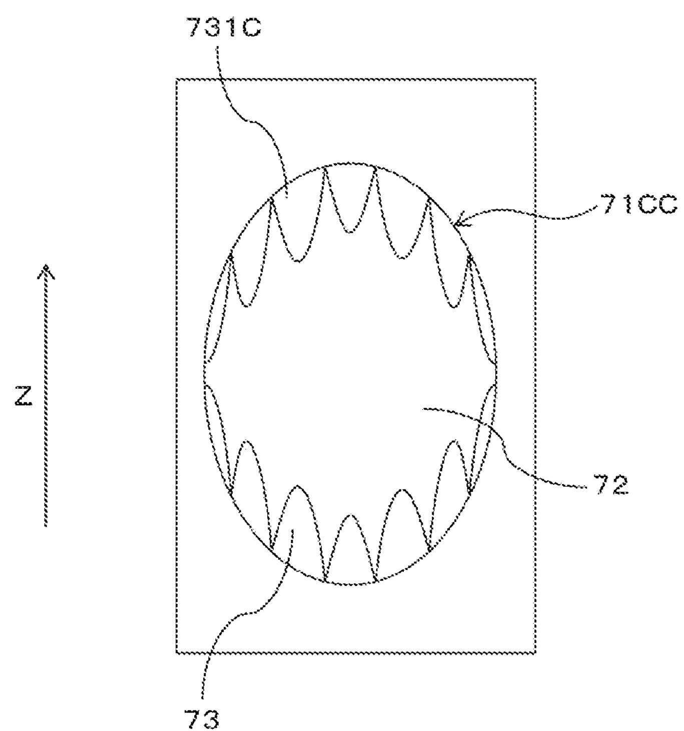
FIG. 12 shows a recess located on a circumferential center side in a center zone of the half bearing in FIG. 11, viewed from the sliding surface side.
Figure 13:
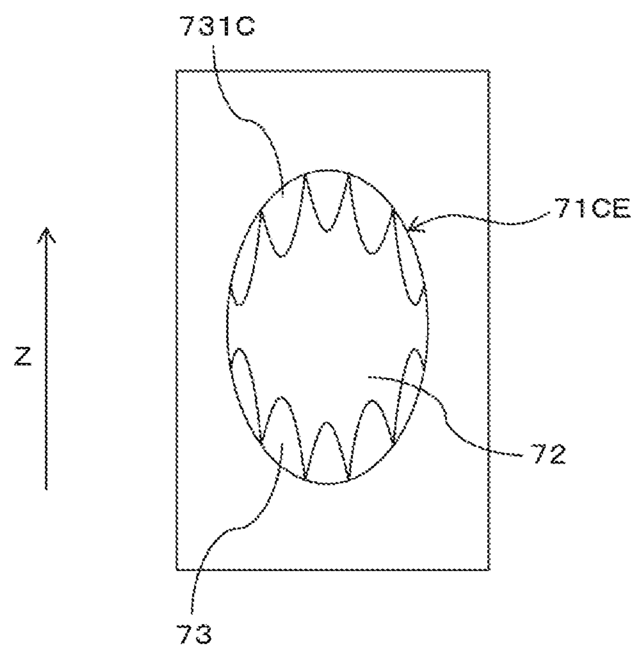
FIG. 13 shows a recess located on a circumferential end side in the center zone of the half bearing in FIG. 11, viewed from the sliding surface side.

Furthermore, as the recess 71C on the sliding surface 7 in the center zone 7C of the bearing half 31, 32 is located closer to the circumferential center 10 of the bearing half 31, 32 in the circumferential direction, an area ratio S1 of a groove forming zone to the recess decreases. In other words, as the recess 71C is located closer to the circumferential end in the center zone 7C, the area ratio S1 increases. FIG. 12 shows a recess 71CC (see FIG. 11) of the bearing half 31, 32, viewed from the sliding surface side, located close to the circumferential center. FIG. 13 shows a recess 710E of the bearing half 31, 32, viewed from the sliding surface side, located close to the circumferential end in the center zone 7C.

Figure 15:
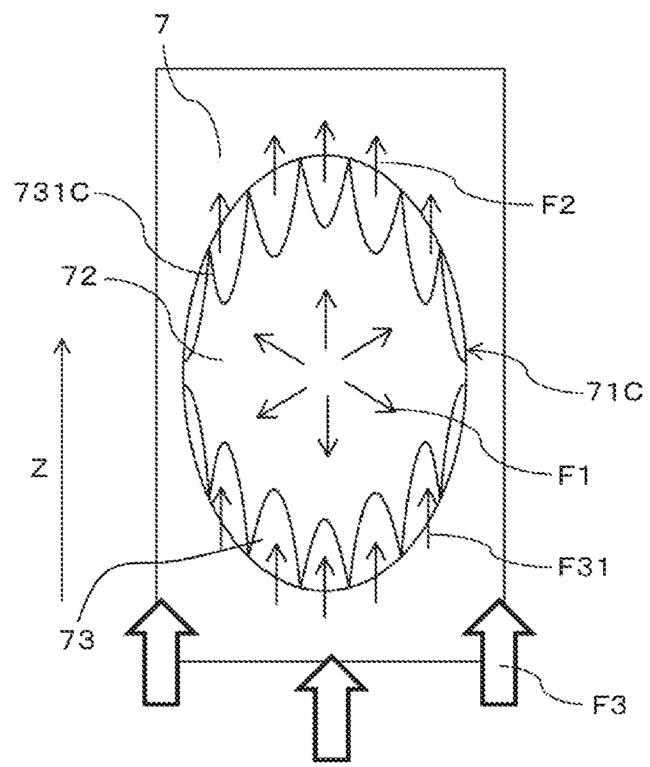
FIG. 15 shows oil flows in the recess of the half bearing in FIG. 11.

In a four-stroke internal combustion engine, as the recess is located closer to the circumferential center of the half bearing, oil pressure in the recess becomes higher, and as the recess is located closer to the circumferential end in the center zone 7C of the half bearing, the oil pressure in the recess is less increased. In the embodiment, as the recess 71C is located closer to the circumferential center 10, an area ratio S1 of the groove forming zone 73 to the recess decreases and an area ratio of the plane zone 72 increases. FIG. 15 shows the recess 71CC, viewed from the sliding surface side, located close to the circumferential center 10 of the sliding surface 7 of the bearing half 31, 32. FIG. 15 shows an oil flow F2 flowing from the recess 71CC into a gap between the sliding surface 7 and a surface of a shaft 5 when the sliding surface 7 becomes closest to the surface of the shaft 5. An arrow Z indicates a rotation direction of the shaft.

If the area ratio S1 of the groove forming zone 73 is large and the area ratio of the plane zone 72 is small, the oil whose pressure has become high near the center of the opening of the recess is guided to the circumferential grooves 731C, and the oil flow F2 may be formed in the same direction as the shaft rotation direction Z from the recess 71CC toward the gap, as well as an oil flow flowing in a direction opposite to the shaft rotation direction Z. When the oil flow flowing in the direction opposite to the shaft rotation direction Z is formed, the oil flow collides with an oil flow F3 which follows the surface of the shaft and flows in a direction parallel to the shaft rotation direction Z, and this causes turbulence.

On the other hand, as in the recess 71CC of the embodiment where the area ratio S1 of the groove forming zone 73 is small and the area ratio of the plane zone 72 is large, an oil flow F1 flowing in a direction different from the shaft rotation direction Z is more likely to be formed in the plane zone 72, and thus fewer oil flow components of the oil flow F1 flow in the direction opposite to the shaft rotation direction Z. When the area of the plane zone 72 is large, pressure of the oil whose pressure has become high in the plane zone 72 near the center of the recess 71CC is more likely to be reduced before the oil reaches the groove forming zone 73. Accordingly, due to the circumferential grooves 731C formed on a rear side in the shaft rotation direction Z of the recess 71CC, an oil flow F31 guided into the recess 71CC is formed from part of the oil flow F3 which follows the surface of the shaft and flows in the gap in the direction parallel to the rotation direction Z of the shaft.

In the recess 710E, however, pressure of oil is less likely to become high even when the surface of the shaft becomes closest to a surface of the recess 710E. Thus, an oil flow flowing in the direction opposite to the shaft rotation direction Z is less likely to be formed from the oil in the recess 710E. Accordingly, it is preferable to increase an area ratio of a groove forming zone 73 to the recess 710E to enhance an effect that the circumferential grooves 731C allows the oil in the recess 710E to form an oil flow F2 flowing in the same direction as the shaft rotation direction Z.

The recess 71E on the sliding surface 7 in the end zone 7E has a curved surface which is recessed toward the outer diameter side (i.e. convex toward the outer diameter side) of the bearing half 31, 32 not only in cross-sectional view in the direction parallel to the circumferential direction of the bearing half 31, 32 but also in cross-sectional view in any direction other than the direction parallel to the circumferential direction.

Figure 14:
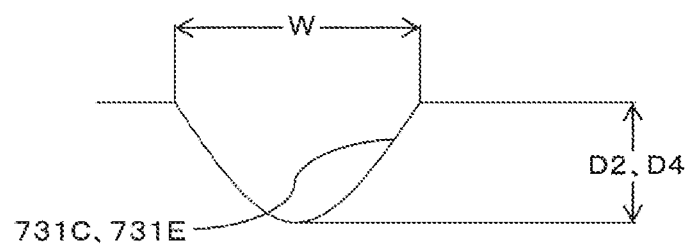
FIG. 14 is a cross-sectional view of a circumferential groove in a recess of the half bearing in FIG. 11.

Circumferential grooves 731E in the recess 71E have an arcuate cross section (see FIG. 14). Except the grooves at end regions of the recess 71E in the axial direction of the half bearing, a width W of the circumferential groove 731E is maximum on a peripheral edge side of the recess and decreases toward a center of the recess. Similarly, a depth D4 of the circumferential groove 731E is maximum on the peripheral edge side of the recess and decreases toward the center of the recess.

As the recess 71E in the end zone 7E is located closer to the circumferential center 10 of the bearing half 31, 32, a depth D3 (maximum depth) of the recess 71E increases. In other words, as the recess 71E is located closer to the circumferential end 76, the depth D3 decreases. Furthermore, as the recess 71E is located closer to the circumferential center 10 of the bearing half 31, 32, the area A1 of the recess 71E increases. In other words, as the recess 71E is located closer to the circumferential end 76, the area A1 decreases.

Furthermore, as the recess 71E on the sliding surface 7 in the end zone 7E of the bearing half 31, 32 is located closer to the circumferential center 10 of the bearing half 31, 32 in the circumferential direction, an area ratio S2 of a groove forming zone to the recess decreases. In other words, as the recess 71E is located closer to the circumferential end 76, the area ratio S2 increases.

A relationship between the depth D4 of the circumferential groove 731E in the recess 71E on the sliding surface 7 in the end zone 7E and the depth D2 of the circumferential groove 731C in the recess 71C on the sliding surface 7 in the center zone 7C is the same as those in the first embodiment. Also, a relationship between the area ratio S2 of the groove forming zone to the recess in the recess 71E on the sliding surface 7 in the end zone 7E and the area ratio S1 of the groove forming zone to the recess in the recess 71C on the sliding surface 7 in the center zone 7C is the same as those in the first embodiment.

Third Embodiment

Figure 16:
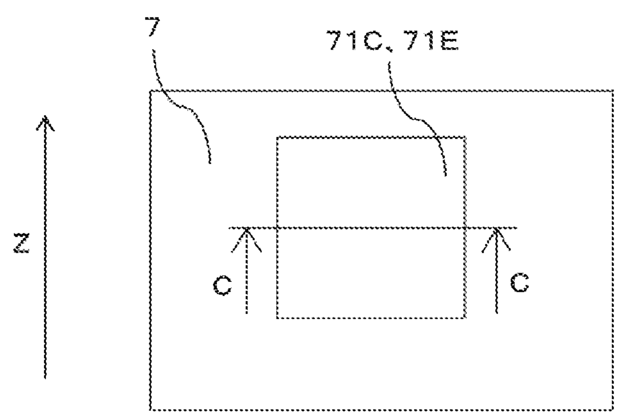
FIG. 16 shows a recess of the half bearing according to a third embodiment of the present invention, viewed from the sliding surface side.

FIG. 16 shows a recess 71C, 71E having a quadrilateral opening on the sliding surface 7. An arrow Z indicates the rotation direction of the shaft. Two sides of the quadrilateral opening of the recess are parallel to the rotation direction of the shaft. Please note that circumferential grooves 731C, 731E are omitted in FIG. 16.

Figures 17, 18:
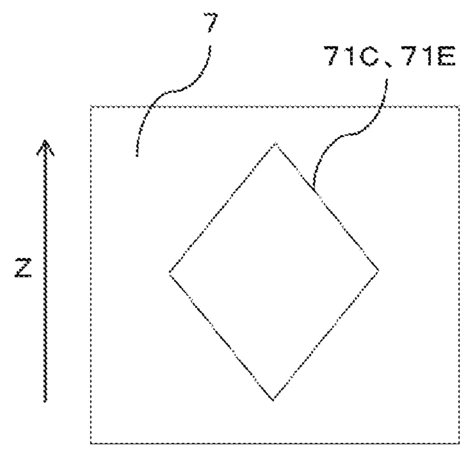
FIG. 17 is a cross-sectional view of a C-C cross section (in axial direction) of the recess in FIG. 16.
FIG. 18 shows a recess of the half bearing according to a fourth embodiment of the present invention, viewed from the sliding surface side.

FIG. 17 shows a C-C cross-sectional view (a cross section in the axial direction of the bearing half 31, 32) of the recess 71C, 71E in FIG. 16. The cross section has a reverse trapezoidal shape, and a surface of the recess 71C, 71E is parallel to the sliding surface 7, excluding the surface at both ends in the axial direction of the bearing half 31, 32. Please note that the circumferential grooves 731C, 731E are also omitted in FIG. 17. The surface of the recess 71C, 71E in cross-sectional view in a direction parallel to the circumferential direction of the bearing half 31, 32 is a curved surface recessed toward the outer diameter side of the bearing half 31, 32.

Fourth Embodiment

FIG. 18 shows a recess 71C, 71E having a quadrilateral opening on the sliding surface 7. Unlike in FIG. 16, a diagonal line of the quadrilateral opening of the recess is parallel to the rotation direction of the shaft. In the recess 71C, 71E in FIG. 18, a surface of the recess 71C, 71E in cross-sectional view in a direction parallel to the circumferential direction of the bearing half 31, 32 is a curved surface recessed toward the outer diameter side of the bearing half 31, 32. Also, the surface of the recess 71C, 71E in cross-sectional view in a direction parallel to the axial direction of the bearing half 31, 32 is a curved surface recessed toward the outer diameter side. Also in FIG. 18, circumferential grooves 731C, 731E are omitted.

As stated above, circular, elliptical, and quadrilateral shapes are explained as the shape of the opening of the recess 71C, 71E. However, these shapes of the opening do not indicate geometrically precise circular, elliptical, and quadrilateral shapes and they may be substantially circular, elliptical, and quadrilateral. Furthermore, the shape of the opening of the recess 71C, 71E is not limited to these shapes and other shapes may be applied.

The above description is made to the embodiments where the half bearing of the present invention is applied to the connecting rod bearing for supporting a crankpin of a crankshaft of an internal combustion engine. The half bearing of the present invention is also applicable to one or both of the pair of half bearings for constituting a main bearing for supporting a journal part of the crankshaft. Furthermore, the half bearing may have an oil hole or an oil groove. The half bearing may be configured such that a plurality of grooves extending in the circumferential direction of the half bearing are located throughout the sliding surface excluding the recesses 71C and 71E.

The invention claimed is:

1. A half bearing for constituting a sliding bearing for supporting a crankshaft of an internal combustion engine, the half bearing having a semi-cylindrical shape and having an inner surface, the inner surface forming a sliding surface, wherein the sliding surface of the half bearing comprises a center zone and end zones on both sides of the center zone, the center zone including a circumferential center of the half bearing, wherein the sliding surface in each of the center zone and the end zones has a circular arc surface shape, a circle center of a circular arc surface of each of the end zones deviating from a circle center of a circular arc surface of the center zone away from the half bearing, the center zone being in a circumferential angle range of ±65° at maximum with respect to the circumferential center, wherein the center zone and the end zones each comprises a plurality of recesses, each recess having a recess surface and a peripheral edge, the recess surface being recessed from the sliding surface toward an outer diameter side of the half bearing, wherein the recess surface forms a convex curve toward the outer diameter side of the half bearing in cross-sectional view in a direction parallel to a circumferential direction of the half bearing, wherein the recess comprises a groove forming zone adjacent to the peripheral edge of the recess, the groove forming zone comprising a plurality of circumferential grooves, the circumferential grooves being recessed from the recess surface toward the outer diameter side of the half bearing, wherein the circumferential grooves extend from the peripheral edge of the recess along the circumferential direction of the half bearing, wherein an area ratio S2 of an area of the groove forming zone in the recess to an area of the recess in the end zone is larger than an area ratio of an area of the groove forming zone in the recess to an area of the recess in the center zone, and wherein a maximum depth D4 of the circumferential groove in the recess in the end zone is larger than a maximum depth D2 of the circumferential groove in the recess in the center zone.

2. The half bearing according to claim 1, wherein the area ratio S2 of the area of the groove forming zone in the recess to the area of the recess in the end zone is 1.5 times or more as large as the area ratio S1 of the area of the groove forming zone in the recess to the area of the recess in the center zone.

3. The half bearing according to claim 1, wherein the maximum depth D4 of the circumferential groove in the recess in the end zone is twice or more as large as the maximum depth D2 of the circumferential groove in the recess in the center zone.

4. The half bearing according to claim 1, wherein a depth D1 of the recess in the center zone is 2 to 50 μm.

5. The half bearing according to claim 1, wherein a depth D2 of the circumferential groove in the center zone increases from a center of the recess toward a peripheral edge side of the recess.

6. The half bearing according to claim 1, wherein the maximum depth D2 of the circumferential groove in the center zone is 0.5 to 3 μm.

7. The half bearing according to claim 1, wherein the maximum depth D4 of the circumferential groove in the end zone is 1 to 10 μm.

8. The half bearing according to claim 1, wherein a maximum width W of the circumferential groove is 20 to 150 μm.

9. The half bearing according to claim 1, wherein the area ratio S1 of the area of the groove forming zone in the recess to the area of the recess in the center zone is 0.15 to 0.55.

10. The half bearing according to claim 1, wherein the area ratio S2 of the area of the groove forming zone in the recess to the area of the recess in the end zone is 0.3 to 0.90.

11. The half bearing according to claim 1, wherein an opening of the recess has a circular shape, an elliptical shape, or a quadrilateral shape.

12. The half bearing according to claim 1, wherein the recess surface forms a convex curve toward the outer diameter side of the half bearing in cross-sectional view in an axial direction of the half bearing.

13. The half bearing according to claim 1, wherein the recesses are uniformly located throughout the sliding surface of the half bearing.

14. The half bearing according to claim 1, wherein as the recess in the center zone is located closer to the circumferential center of the half bearing, the depth D1 of the recess increases.

15. The half bearing according to claim 1, wherein as the recess in the center zone is located closer to the circumferential center of the half bearing, an area A1 of the opening of the recess increases.

16. The half bearing according to claim 1, wherein as the recess in the center zone is located closer to the circumferential center of the half bearing, the area ratio S1 of the area of the groove forming zone to the area of the recess decreases.

17. The half bearing according to claim 1, wherein the center zone includes a circumferential angle range of ±40° at minimum with respect to the circumferential center.

18. A sliding bearing for supporting a crankshaft of an internal combustion engine, wherein the sliding bearing comprises the half bearing according to claim 1, and the sliding bearing has a cylindrical shape.

19. The sliding bearing according to claim 18, wherein the sliding bearing comprises a pair of the half bearings.

* * * * *